(12) United States Patent
Roberge

(10) Patent No.: US 11,958,623 B2
(45) Date of Patent: *Apr. 16, 2024

(54) THERMAL MANAGEMENT SYSTEM FOR GAS TURBINE ENGINE

(71) Applicant: RTX Corporation, Farmington, CT (US)

(72) Inventor: Gary D. Roberge, Tolland, CT (US)

(73) Assignee: RTX Corporation, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/979,393

(22) Filed: Nov. 2, 2022

(65) Prior Publication Data

US 2023/0058015 A1 Feb. 23, 2023

Related U.S. Application Data

(63) Continuation of application No. 16/207,799, filed on Dec. 3, 2018, now Pat. No. 11,519,295.

(51) Int. Cl.
| | |
|---|---|
| B64D 29/00 | (2006.01) |
| B22F 5/00 | (2006.01) |
| B22F 10/20 | (2021.01) |
| B64D 33/08 | (2006.01) |
| F01D 25/12 | (2006.01) |
| F01D 25/14 | (2006.01) |
| F01D 25/18 | (2006.01) |
| F02K 3/06 | (2006.01) |

(Continued)

(52) U.S. Cl.
CPC .............. B64D 33/08 (2013.01); B22F 5/009 (2013.01); B22F 10/20 (2021.01); B64D 29/00 (2013.01); F01D 25/12 (2013.01); F01D 25/14 (2013.01); F01D 25/18 (2013.01); F02K 3/06 (2013.01); B22F 10/12 (2021.01); B22F 10/14 (2021.01); B22F 10/18 (2021.01); B22F 10/25 (2021.01); B22F 10/28 (2021.01); F05D 2230/22 (2013.01); F05D 2260/213 (2013.01); F05D 2260/22141 (2013.01); F28D 2021/0026 (2013.01)

(58) Field of Classification Search
CPC ........ B64D 29/00; B64D 29/08; B64D 33/08; F01D 25/12; F01D 25/14; F02K 3/105; F05D 2260/213; F05D 2260/22141; F28D 2021/0026

See application file for complete search history.

(56) References Cited

U.S. PATENT DOCUMENTS

| 5,269,133 A | 12/1993 | Wallace |
| 6,931,834 B2 | 8/2005 | Jones |

(Continued)

FOREIGN PATENT DOCUMENTS

| EP | 1985537 A2 | 10/2008 |
| EP | 2894323 A1 | 7/2015 |

(Continued)

*Primary Examiner* — Christopher R Legendre
(74) *Attorney, Agent, or Firm* — Bachman & LaPointe, P.C.

(57) ABSTRACT

A thermal management system for a gas turbine engine includes an additively manufactured nacelle component, at least a portion of the additively manufactured nacelle component forming an additively manufactured heat exchanger that extends into a fan bypass flow.

21 Claims, 8 Drawing Sheets

(51) Int. Cl.
*F28D 21/00* (2006.01)
*B22F 10/12* (2021.01)
*B22F 10/14* (2021.01)
*B22F 10/18* (2021.01)
*B22F 10/25* (2021.01)
*B22F 10/28* (2021.01)

(56) References Cited

U.S. PATENT DOCUMENTS

| | | |
|---|---|---|
| 7,856,824 B2 | 12/2010 | Anderson et al. |
| 9,051,943 B2 | 6/2015 | Elder |
| 9,233,757 B2 * | 1/2016 | James ............... B64D 27/00 |
| 9,599,410 B2 | 3/2017 | Antel, Jr. et al. |
| 9,844,807 B2 | 12/2017 | Yalin et al. |
| 10,914,185 B2 | 2/2021 | Bonacum et al. |
| 11,519,295 B2 * | 12/2022 | Roberge ............... B64D 33/08 |
| 2006/0042255 A1 | 3/2006 | Bunker et al. |
| 2009/0165995 A1 | 7/2009 | Bajusz et al. |
| 2014/0090808 A1 | 4/2014 | Bessho et al. |
| 2015/0198092 A1 | 7/2015 | Weiner |
| 2015/0211801 A1 | 7/2015 | Philippart et al. |
| 2016/0108813 A1 | 4/2016 | Schmitz |
| 2017/0370246 A1 | 12/2017 | Olver et al. |
| 2018/0347468 A1 | 12/2018 | Caimano et al. |
| 2019/0145348 A1 | 5/2019 | Foutch et al. |
| 2019/0153947 A1 | 5/2019 | Peyron et al. |
| 2019/0338673 A1 * | 11/2019 | Edwards ............... F01M 11/04 |
| 2020/0173307 A1 | 6/2020 | Roberge |
| 2020/0173365 A1 | 6/2020 | Roberge |
| 2023/0058015 A1 * | 2/2023 | Roberge ............... F28F 13/12 |

FOREIGN PATENT DOCUMENTS

| | | |
|---|---|---|
| EP | 3012436 A1 | 4/2016 |
| EP | 3413001 A1 | 12/2018 |
| EP | 3483413 A1 | 5/2019 |
| WO | 2012/037988 A1 | 3/2012 |
| WO | 2018/015659 A1 | 1/2018 |

* cited by examiner

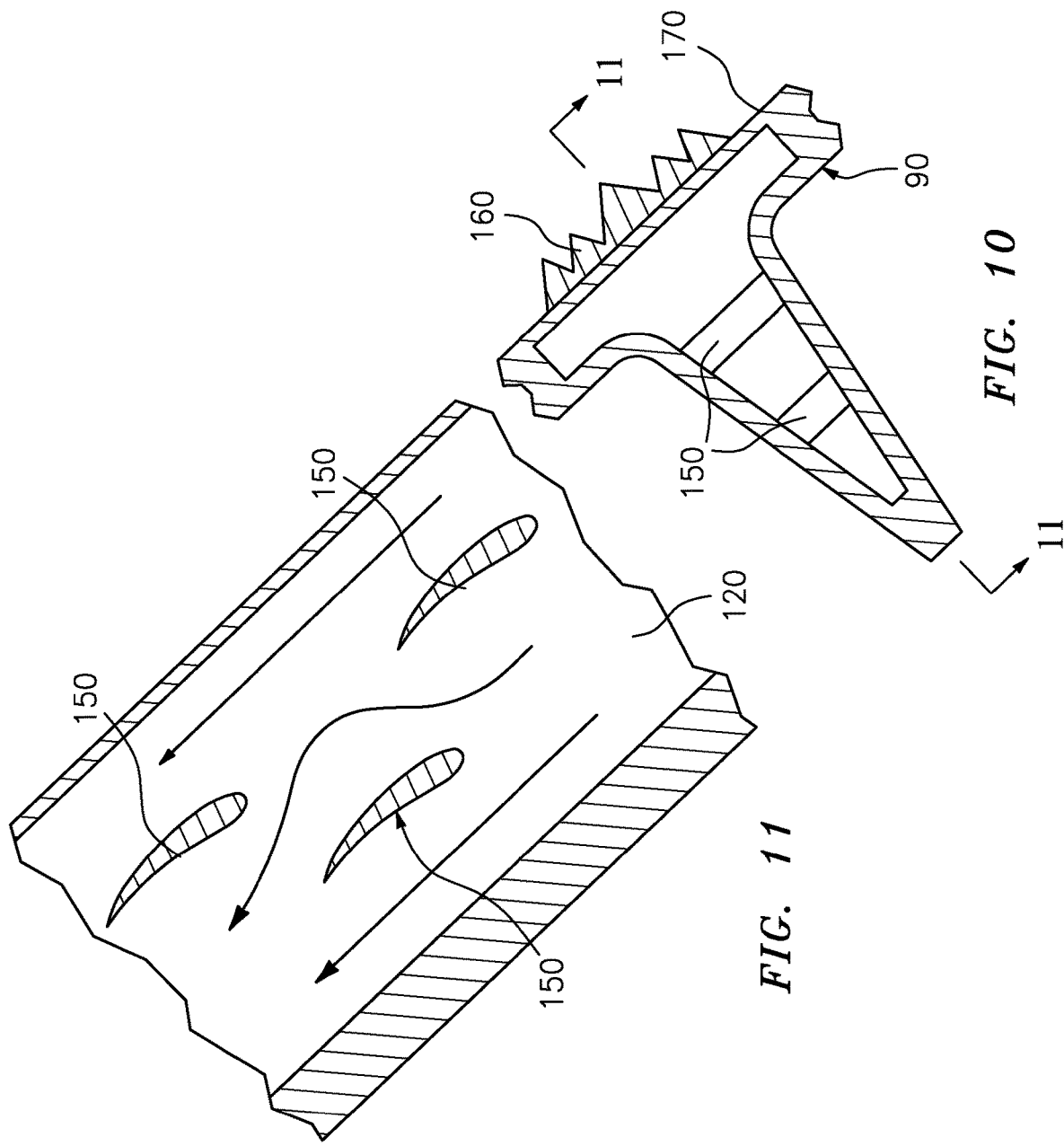

THERMAL MANAGEMENT SYSTEM FOR GAS TURBINE ENGINE

CROSS-REFERENCE TO RELATED APPLICATIONS

This application is a continuation of U.S. patent application Ser. No. 16/207,799, filed Dec. 3, 2018.

BACKGROUND

The present disclosure relates to a gas turbine engine and, more particularly, to a thermal management system at least partially integrated into a nacelle assembly.

Aircraft gas turbine engine thermal management systems utilize engine oil to reject heat from a number of sources such as bearing compartments, geared turbofan architectures, motor/generators, and other systems. Rejecting heat from the engine oil to maintain a desired operating temperature is then accomplished through one or more heat exchangers that typically require associated ducting and other ancillary structures within and through the engine nacelle assembly. Such multiple heat exchangers and ancillary structures may complicate and reduce engine efficiency.

SUMMARY

A thermal management system for a gas turbine engine according to one disclosed non-limiting embodiment of the present disclosure includes an additively manufactured nacelle component, at least a portion of the additively manufactured nacelle component forming an additively manufactured heat exchanger.

A further embodiment of any of the foregoing embodiments includes that the additively manufactured nacelle component is a core cowl.

A further embodiment of any of the foregoing embodiments includes that the additively manufactured heat exchanger is positioned to interact with a fan bypass airflow.

A further embodiment of any of the foregoing embodiments includes that the additively manufactured heat exchanger comprises an external surface that extends into the fan bypass airflow.

A further embodiment of any of the foregoing embodiments includes that the additively manufactured heat exchanger comprises a multiple of fins that extend into the fan bypass airflow.

A further embodiment of any of the foregoing embodiments of the present disclosure includes a multiple of external features that extend from at least one of the multiple of fins.

A further embodiment of any of the foregoing embodiments includes that at least one of the multiple of external features comprises a chevron.

A further embodiment of any of the foregoing embodiments includes that at least one of the multiple of external features comprises a bump.

A further embodiment of any of the foregoing embodiments includes that the additively manufactured heat exchanger comprises a multiple of fins that extend into the fan bypass airflow, the multiple of fins define a non-linear path with respect to the fan bypass airflow.

A further embodiment of any of the foregoing embodiments of the present disclosure includes a multiple of external features that extend from at least one of the multiple of fins.

A further embodiment of any of the foregoing embodiments includes that the additively manufactured heat exchanger comprises a multiple of fins that extend into the fan bypass airflow, at least one of the multiple of fins comprise a passage for a fluid.

A further embodiment of any of the foregoing embodiments includes that each of the multiple of passages comprise a tailored cross-sectional geometry that correspond with the external surface.

A further embodiment of any of the foregoing embodiments includes that the tailored cross-sectional geometry is of a "T" shape.

A core cowl door for a gas turbine engine according to one disclosed non-limiting embodiment of the present disclosure includes an additively manufactured heat exchanger that comprises an external surface of the core cowl door; a multiple of additively manufactured passages that comprise a tailored cross-sectional geometry that corresponds with the external surface; and a tank within the core cowl door, the tank in communication with at least one of the multiple of additively manufactured passages.

A further embodiment of any of the foregoing embodiments includes that the external surface comprises a multiple of fins that extend into a fan bypass airflow, at least one of the multiple of fins contains at least one of the multiple of additively manufactured passages, at least one of the multiple of additively manufactured passages of a tailored cross-sectional geometry that correspond with the external surface.

A further embodiment of any of the foregoing embodiments includes that the tank is an additively manufactured tank formed into the internal surface of the core cowl door.

A method of thermal management for a gas turbine engine according to one disclosed non-limiting embodiment of the present disclosure includes communicating an oil through an additively manufactured heat exchanger that comprises an external surface of a core cowl door.

A further embodiment of any of the foregoing embodiments includes that the external surface of the core cowl door that defines the additively manufactured heat exchanger facilitates a uniform fan bypass flow.

A further embodiment of any of the foregoing embodiments includes that the external surface of the core cowl door that defines the additively manufactured heat exchanger facilitates acoustics associated with a fan bypass flow A further embodiment of any of the foregoing embodiments of the present disclosure includes, further comprising circulating the oil from the tank located below the gas turbine engine via a distribution manifold located above the gas turbine engine.

The foregoing features and elements may be combined in various combinations without exclusivity, unless expressly indicated otherwise. These features and elements as well as the operation thereof will become more apparent in light of the following description and the accompanying drawings. It should be appreciated that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 10 is a schematic cross-sectional view of one oil flow passages within the core cowl door according to one disclosed non-limiting embodiment.

FIG. 11 is a schematic cross-sectional view of one oil flow passages within the core cowl door according to anther disclosed non-limiting embodiment.

DETAILED DESCRIPTION

Figure 1:
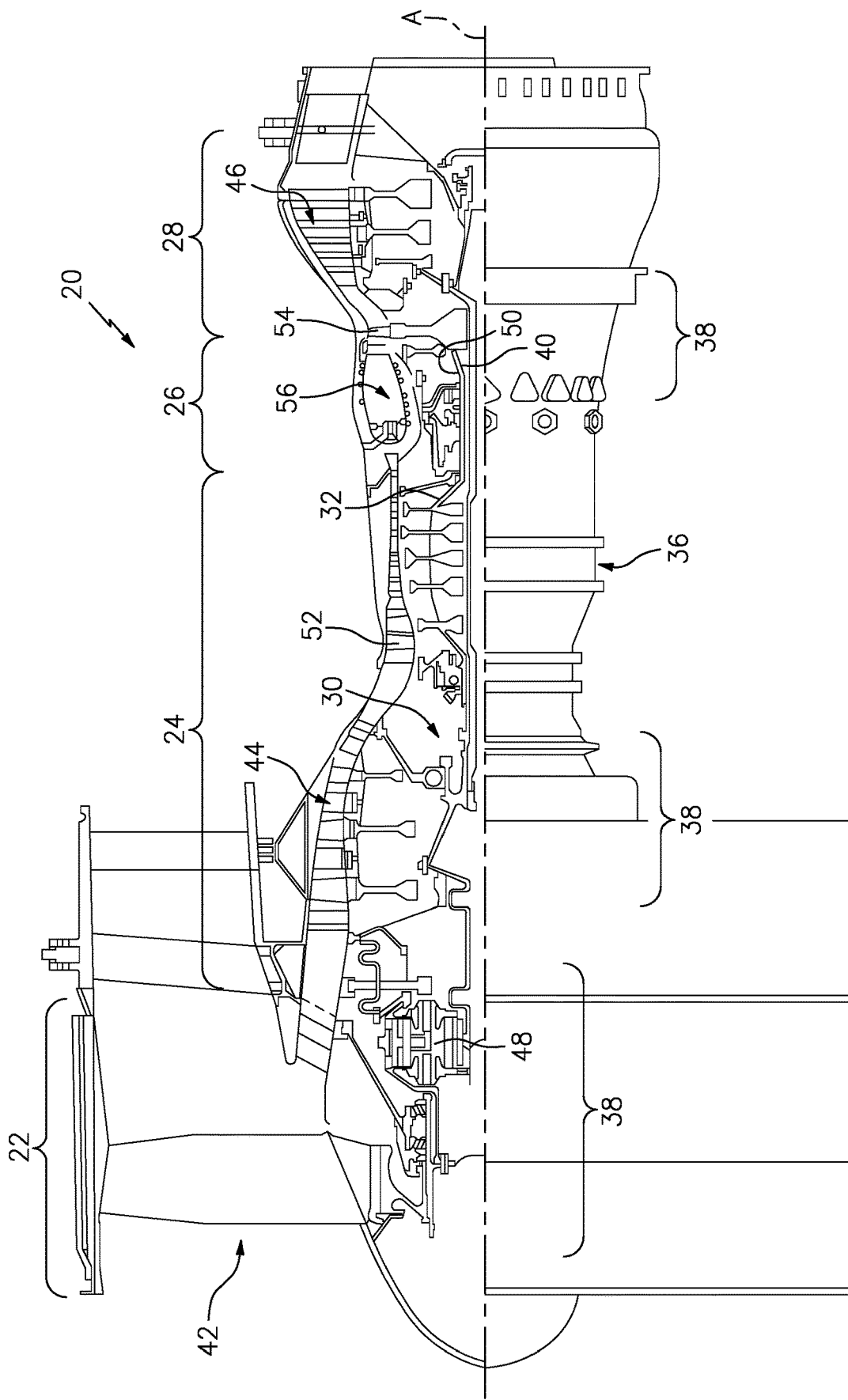
FIG. 1 is a schematic cross-section of a gas turbine engine.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be appreciated that the concepts described herein are not limited to use with turbofans as the teachings may be applied to other types of turbine engine architectures.

The engine 20 generally includes a low spool 30 and a high spool 32 mounted for rotation about an engine central longitudinal axis A relative to an engine case structure 36 via several bearing compartments 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by bearing compartments 38 within the engine case structure 36. It should be appreciated that various bearing compartments 38 at various locations may alternatively or additionally be provided.

In one non-limiting embodiment, the gas turbine engine 20 is a high-bypass geared architecture engine in which the bypass ratio is greater than six (6:1). The geared architecture 48 can include an epicyclic gear train, such as a planetary gear system, star gear system or other gear system. The example epicyclic gear train has a gear reduction ratio of greater than 2.3, and in another example is greater than 2.5. The geared turbofan enables operation of the low spool 30 at higher speeds which can increase the operational efficiency of the low pressure compressor 44 and low pressure turbine 46 and render increased pressure in a fewer number of stages.

A pressure ratio associated with the low pressure turbine 46 is pressure measured prior to the inlet of the low pressure turbine 46 as related to the pressure at the outlet of the low pressure turbine 46 prior to an exhaust nozzle of the gas turbine engine 20. In one non-limiting embodiment, the bypass ratio of the gas turbine engine 20 is greater than ten (10:1), the fan diameter is significantly larger than that of the low pressure compressor 44, and the low pressure turbine 46 has a pressure ratio that is greater than five (5:1). It should be appreciated, however, that the above parameters are only exemplary of one embodiment of a geared architecture engine and that the present disclosure is applicable to other gas turbine engines including direct drive turbofans.

The high bypass ratio results in a significant amount of thrust. The fan section 22 of the gas turbine engine 20 is designed for a particular flight condition—typically cruise at 0.8 Mach and 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $(``T"/518.7)^{0.5}$. The Low Corrected Fan Tip Speed according to one non-limiting embodiment of the example gas turbine engine 20 is less than 1150 fps (351 m/s). The Low Corrected Fan Tip Speed in another non-limiting embodiment of the example gas turbine engine 20 is less than 1200 fps (366 m/s).

Figure 2:
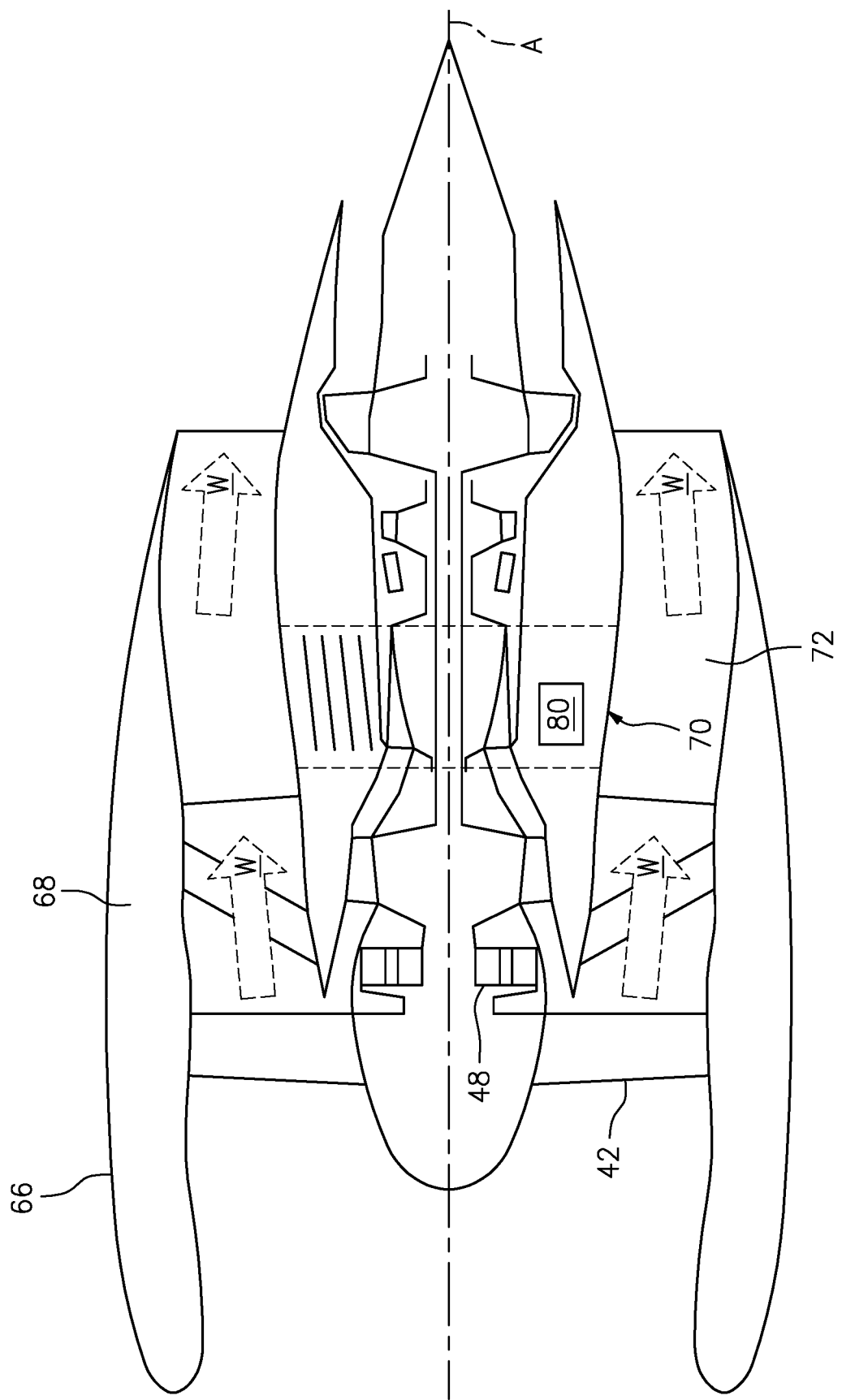
FIG. 2 is an expanded schematic cross-section of airflow paths of the gas turbine engine through a nacelle assembly.

With reference to FIG. 2, the fan 42 drives air along the fan bypass flowpath W to communicate with a thermal management system 80 at least partially integrated into a nacelle assembly 66 for communication with the fan bypass flowpath W. The thermal management system 80 operates as an essentially closed loop system with minimal, if any, extension beyond the core cowl assembly 70. The nacelle assembly 66 may include a fan nacelle assembly 68, a core cowl assembly 70, a bifurcation 72 therebetween, and/or other nacelle components and combinations thereof. The nacelle assembly 66 provides an aerodynamic fairing radially outward of the engine core and associated externals to provide an aerodynamically smooth, low-loss flowpath. In one disclosed non-limiting embodiment, the thermal management system 80 may be in fluid communication with the geared architecture 48, the bearing compartments 38, and/or other systems of the engine 20.

Figure 3:
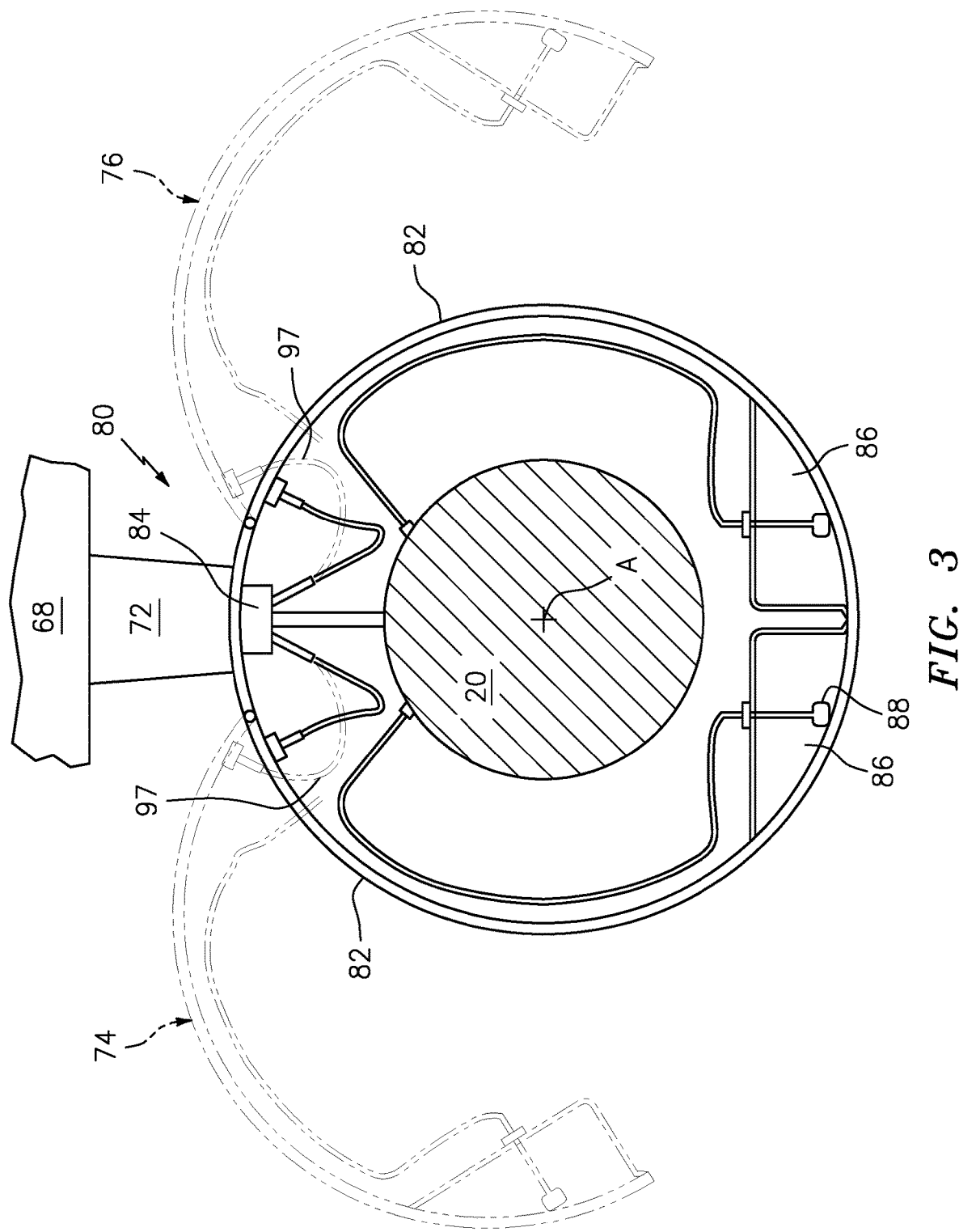
FIG. 3 is cross section of the gas turbine engine illustrating nacelle assembly with core cowl doors in a phantom open position.
Figure 5:
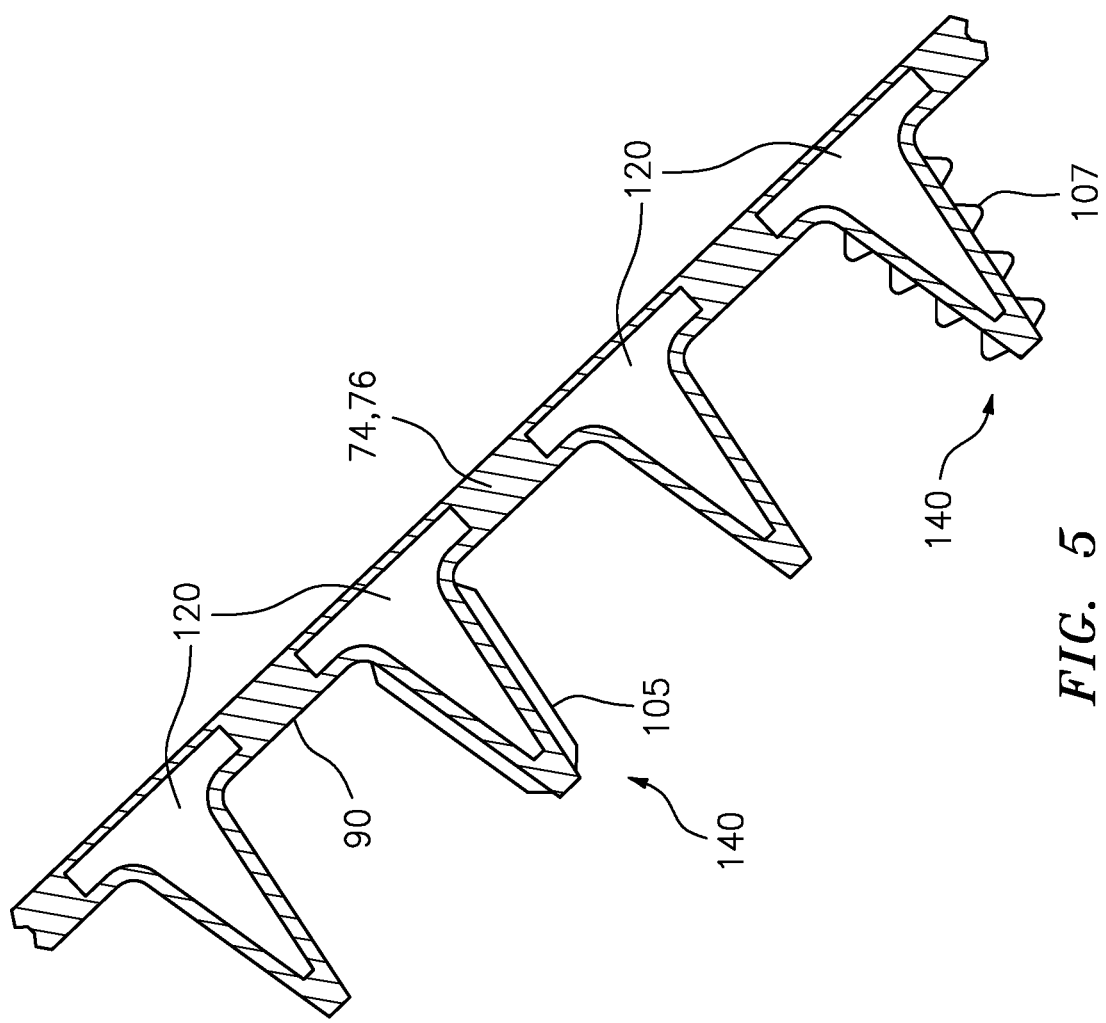
FIG. 5 is a schematic cross-sectional view of an external surface of the core cowl door.

With reference to FIG. 3, the thermal management system 80 generally includes a heat exchanger 82 such as a liquid-air heat exchanger that extracts heat from an oil that circulates therethrough and rejects this heat to bypass flow W. In this embodiment, the heat exchanger 82 is at least partially integrated into two cowl doors 74, 76 (also shown in FIG. 5) of the core cowl assembly 70 (FIGS. 2 and 5). That is, at least a portion of the core cowl assembly 70 and the heat exchanger 82 are additively manufactured such that the heat exchanger 82 is integrated into the cowl doors 74, 76. The thermal management system 80 may be split between the cowl doors 74, 76 or may be independent to provide redundant operation. To permit articulation of the cowl doors 74, 76 for engine access, the distribution manifold 84 and the oil tank 86 may be connected to the heat exchanger 82 via flexible conduits 97.

In this embodiment, the heat exchanger 82 is integrated into the core cowl assembly 70 via additive manufacturing. That is, the cowl doors 74, 76, or portions thereof that form the heat exchanger 82, are manufactured with an additive manufacturing process. The additive manufacturing processes fabricate, or "grow" articles using three-dimensional information such as a three-dimensional computer model. The three-dimensional information is converted into a plurality of slices, each slice defining a cross section of the article for a predetermined height of the slice. The additive manufacturing process sequentially builds-up layers of materials material that include but are not limited to, various titanium alloys including Ti 6-4, Inconel 625 Alloy, Inconel 718 Alloy, Haynes230 Alloy, stainless steel, tool steel, cobalt chrome, titanium, nickel, aluminum, ceramics, plastics and others in atomized powder material form. In other examples, the starting materials can be non-atomized powders, filled or unfilled resins in liquid, solid or semisolid forms, and wire-based approaches such as wire arc for metals and Fused Deposition Modeling (FDM) for polymers. Alloys such as Inconel 625, Inconel 718 and Haynes 230 may have specific benefit for high temperature environments, such as, for example, environments typically encountered by aerospace and gas turbine engine articles. Examples of the additive manufacturing processes include, but are not limited to, SFF processes, 3-D printing methods, Sanders Modelmaker, Selective Laser Sintering (SLS), 3D systems thermojet, ZCorp 3D printing Binder jetting, Extrude ProMetal 3D printing, stereolithography, Layered Object Manufacturing (LOM), Fused Deposition Modeling (FDDM), Electron Beam Sintering (EBS), Direct Metal Laser Sintering (DMLS), Electron Beam Melting (EBM), Electron Beam Powder Bed Fusion (EB-PBF), Electron Beam Powder Wire (EBW), Laser Engineered Net Shaping (LENS), Laser Net Shape Manufacturing (LNSM), Direct Metal Deposition (DMD), Laser Powder Bed Fusion (L-PBF), Digital Light Synthesis™ and Continuous Liquid Interface Production (CLIP™). Although particular additive manufacturing processes are recited, any rapid manufacturing method can alternatively or additionally be used. In addition while additive manufacturing is the envisioned approach for fabrication of heat exchangers 82, alternate embodiments may utilize alternate manufacturing approaches including cast, brazed, welded or diffusion bonded structures.

The heat exchanger 82 of the thermal management system 80 is in communication with a distribution manifold 84, and an oil tank 86 via an electrically driven boost pump 88. The distribution manifold 84 receives heated oil from the engine 20 and distributes the oil to the heat exchanger 82 to extract heat therefrom as the oil moves in a generally downward direction. The heat exchanger 82, as defined herein, may be considered a plate-fin, a shell-tube, or other air-fluid passage geometry.

Figure 4:
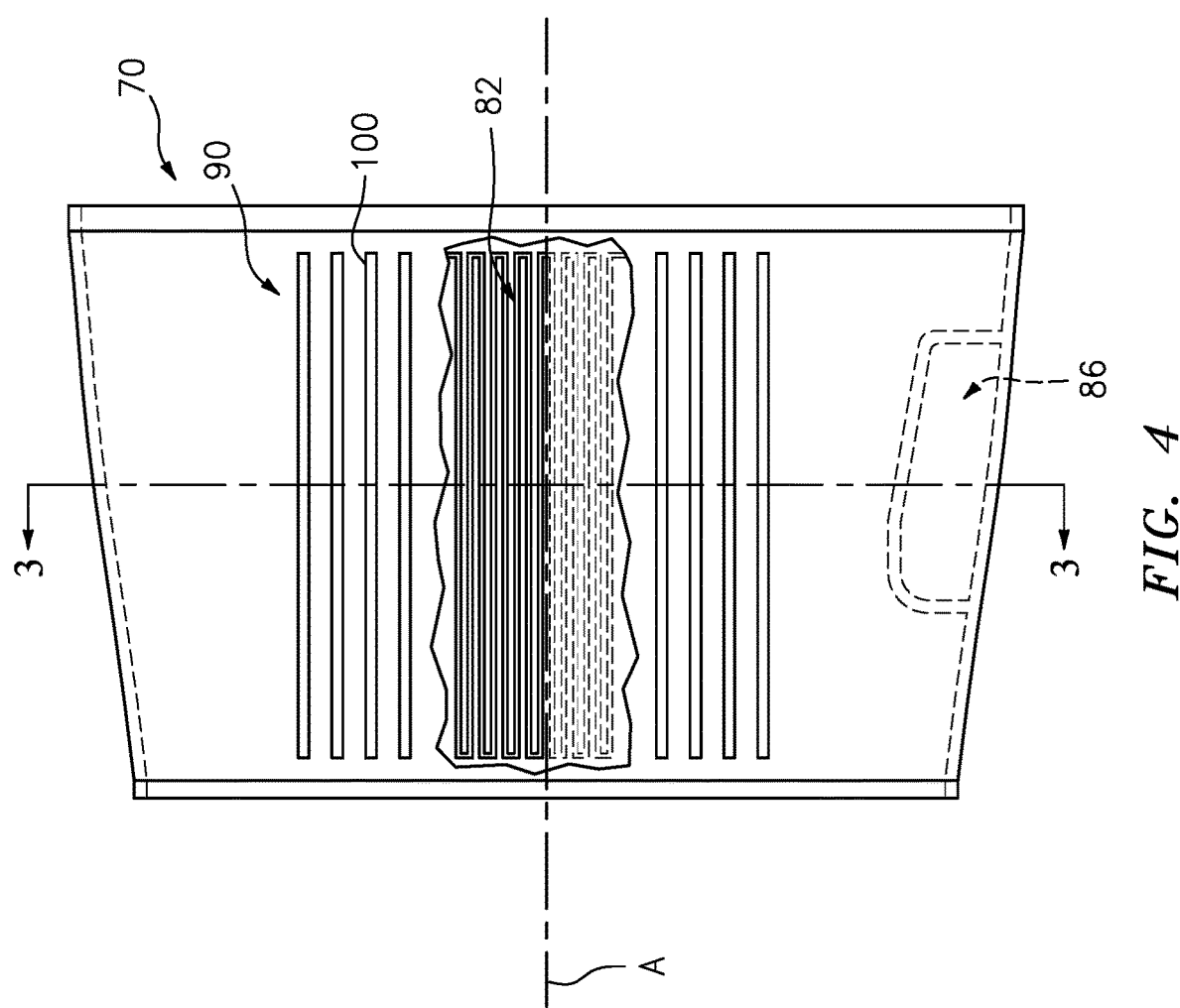
FIG. 4 is a partial phantom exterior side view of the core cowl door.
Figure 7:
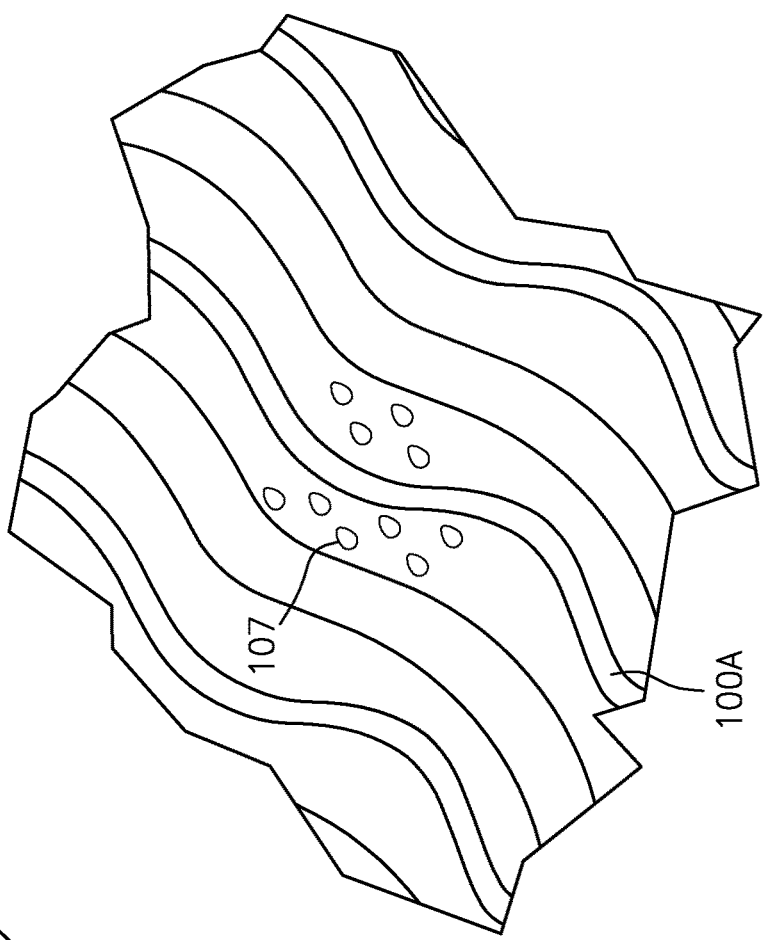
FIG. 7 is a schematic view of the external surface of the core cowl door according to another disclosed non-limiting embodiment.
Figure 6:
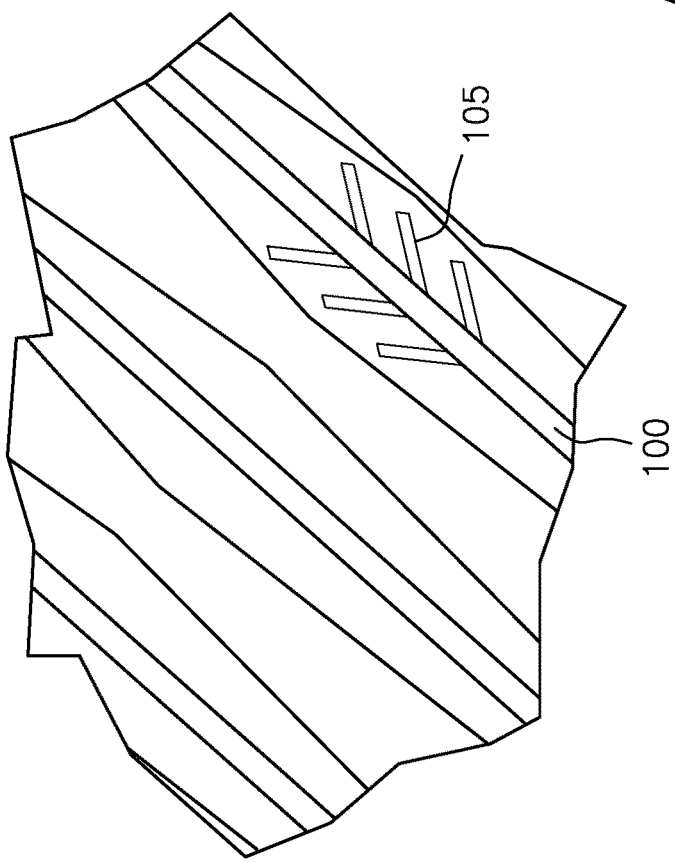
FIG. 6 is a schematic view of the external surface of the core cowl door according to one disclosed non-limiting embodiment.

With reference to FIG. 5 an external surface 90 of the cowl doors 74, 76 that at least partially form the heat exchanger 82 define a contour of the aerodynamic lines of the core cowl assembly 70 used to guide bypass flow W. The contoured external surface 90 may be determined via Computational Flow Dynamics (CFD) that may, for example, be utilized to set a ratio of local surface area to flow area to control the pressure drop per unit length of the bypass duct, acoustics, and/or other considerations. In examples, the external surface 90 of the cowl doors 74, 76 that at least partially form the heat exchanger 82 may be manufactured to form a multiple of linear fins 100 (FIG. 6), serpentine fins 100A (FIG. 7), or other structures that extend along and/or across the length of the cowl doors 74, 76 with respect to the engine central longitudinal axis A. While exterior fins 100 or 100A are depicted as generally parallel to each other and to central axis A (FIG. 4), orientations may also be tailored using the CFD tools described to the streamline orientation of bypass flow A including any disruption causes by local features including bifurcation 72. In this manner, the resulting pressure loss introduced to bypass stream "W" as it interacts with cooling fins 100 and 100A can be minimized. Alternatively, the external surface 90 of the cowl doors 74, 76 that at least partially form the heat exchanger 82 may be contained within a discrete area. That is, the heat exchanger 82 is additively manufactured such that the external surface 90 is contoured to follow the aerodynamic lines of the core cowl assembly 70 such that a portion thereof or the entire surface of the cowl door 74, 76 may be ribbed, finned, corrugated, or otherwise shaped to locate a multiple of passages 120 to interacts with the bypass flow.

Figure 8:
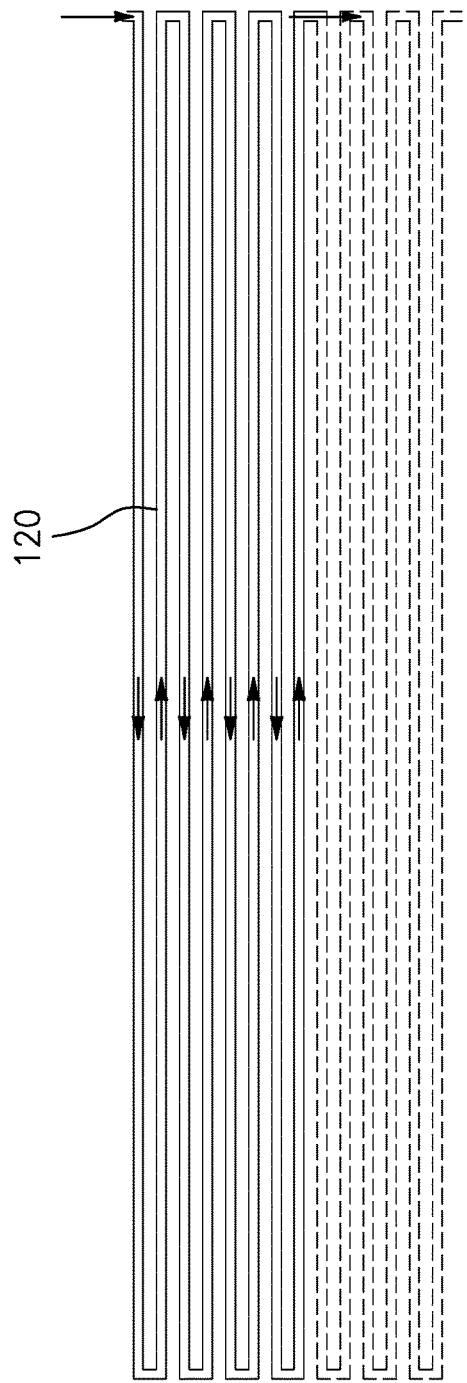
FIG. 8 is a schematic view of oil flow passages within the core cowl door according to one disclosed non-limiting embodiment.
Figure 9:
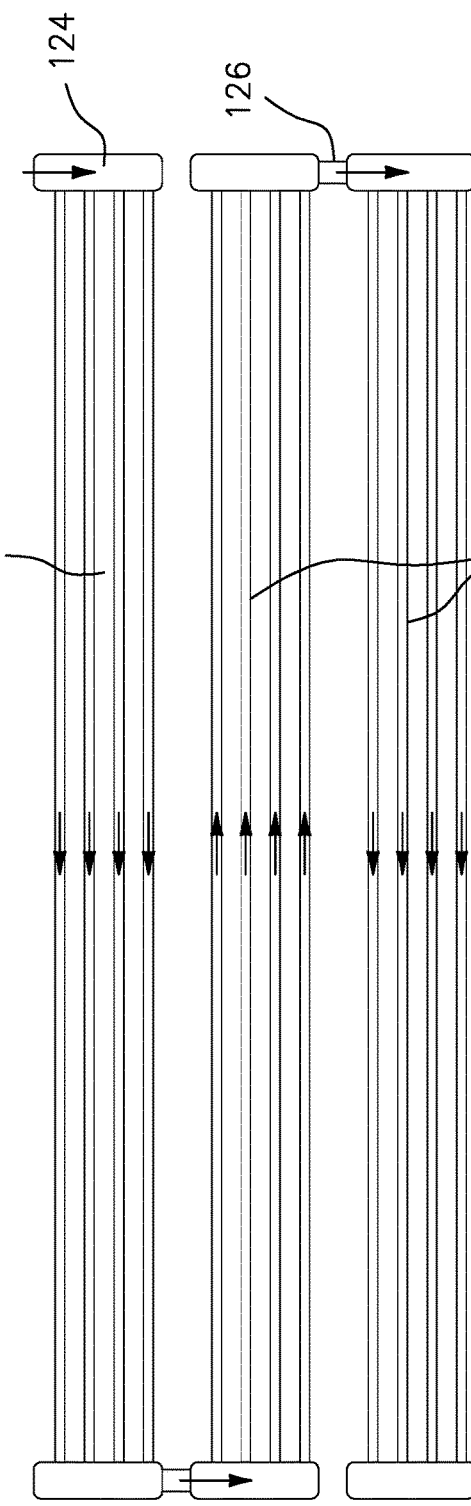
FIG. 9 is a schematic view of oil flow passages within the core cowl door according to anther disclosed non-limiting embodiment.

The external surface 90 of the cowl doors 74, 76 form a heat exchanger 82 over a relatively large surface area to facilitate heat transfer from the multiple of passages 120 that circulate the oil. The multiple of passages 120 (FIG. 8) may be arranged in a serpentine routing to enable the generally downward flow of oil as it passes through the heat exchanger network. Alternatively, the multiple of passages 120 may be formed as groups 122 (FIG. 9) with collection manifolds 124 that are connected by jumpers 126. The multiple of passages 120, collection manifolds 124, and jumpers 126 are readily additively manufactured to be integral with the additively manufactured cowl doors 74, 76.

The cowl doors 74, 76 with the integrated multiple of passages 120 may be formed via additive manufacturing or other techniques to circulate the oil and generally flow in a downward direction toward the oil tanks 86. Oil is collected in the integrally formed oil tanks 86 in each of the cowl doors 74, 76. The electrically driven boost pump 88 resides in each storage tank 86 to pump the cooled oil to the engine's lubrication system.

With continued reference to FIG. 5, each of the multiple of passages 120 may be of a tailored cross-sectional geometry, e.g., "T" shaped to correspond with the external surface 90. Heat transfer may be further augmented by the use of external features 140 (such as chevrons 105 (FIG. 6), bumps 107 (FIG. 7) of other features formed on the external surface 90.

Alternatively, or in addition, heat transfer may be further augmented by inner features 150 (FIGS. 10 and 11) within each of the multiple of passages 120. For example, inner features may be configured by control of fin density, thickness, and type can to balance stress with respect to the thermal loads. In one example, the inner features 150 are airfoil shapes that are staggered to further mix the oil for the purpose of enhancing convective heat transfer. For maximum structural loads, the inner features 150 may include, for example, box, honeycomb, triangular, or other load bearing type structures, while for maximum thermal capabilities, the inner features 150 may include, for example, thin surfaces that provide significant surface area as well as combinations thereof.

Alternatively, or in addition, heat transfer isolation features 160 (FIG. 10) can be added on an internal surface 170 of the core cowl assembly 70 between multiple of passages 120 and the engine 20. The heat transfer isolation features 160 may, for example, insulate the system from the radiant heat load generated from the engine 20 to facilitate reduced heat input to the heat exchanger 82 to reduce the radiated heat input to the oil form the core, and maximize the heat out or cooling to the bypass flow). Examples of heat isolation features include thermal insulation blankets, thermal barrier coatings and reflective coatings with may be used individually or in combination.

The thermal management system 80 provides for a greater cooling surface area compared to individual conventional heat exchangers by utilizing the circumference of the core cowl assembly 70 and the interface with the bypass flow. The surface area provides increased time for cooling as engine oil traverses the circuit from entrance to exit as well as avoids ducting and other associated structures. The external surface of the core cowl assembly 70 may also be configured to provide acoustic attenuation and a more uniform bypass flow resulting from elimination of unique discrete heat exchanger ducting and mixing of streams with differing momentum. In addition, the use of fins 100 and 100A may provide increased core cowl surface area combined with angular features which may be leveraged for the benefit of modified acoustic attenuation. In these concepts, use of acoustic treatment using coatings, perforated acoustic liners, local resonator features, etc. may be integrated into the cooling fins in manners which prevent interaction with internal oil coolant flow. Use of additive manufacturing allows local tailoring improved structural strength, increased wetted area, enhanced cooling effectiveness and weight reduction.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A thermal management system for a gas turbine engine comprising:

a core cowl, at least a portion of the core cowl forming an integral heat exchanger, the heat exchanger comprises an external surface of the core cowl with a multiple of fins each being elongate and extending along the external surface of the core cowl and having a fin height extending from the external surface of the core cowl to interact with a fan bypass airflow, wherein the multiple of fins extend along the external surface along a length that is greater than the fin height, wherein at least one of the multiple of fins contains at least one passage.

2. The system as recited in claim 1, further comprising a multiple of external features that extend from at least one of the multiple of fins.

3. The system as recited in claim 2, wherein at least one of the multiple of external features comprises a chevron.

4. The system as recited in claim 2, wherein at least one of the multiple of external features comprises a bump.

5. The system as recited in claim 1, wherein the multiple of fins define a non-linear path with respect to the fan bypass airflow.

6. The system as recited in claim 5, further comprising a multiple of external features that extend from at least one of the multiple of fins.

7. The system as recited in claim 1, wherein the at least one passage comprises a multiple of passages each comprising a tailored cross-sectional geometry that corresponds with the external surface of the core cowl.

8. The system as recited in claim 7, wherein the tailored cross-sectional geometry is of a "T" shape.

9. The system as recited in claim 1, further comprising an inner feature within the at least one passage.

10. The system as recited in claim 9, further comprising a tank formed into the core cowl door so as to extend from an internal surface of the core cowl, the tank being in fluid communication with the at least one passage.

11. The system as recited in claim 9, wherein the inner feature is of an airfoil shape.

12. The system as recited in claim 9, wherein the inner feature is a load bearing structure.

13. The system as recited in claim 1, wherein each fin of the multiple of fins is defined by two spaced walls extending parallel to each other along the length, and extending from the external surface of the core cowl to define the fin height.

14. A core cowl door for a gas turbine engine comprising:

a heat exchanger that comprises an external surface of the core cowl door, the heat exchanger comprises a multiple of fins that extend outward into a fan bypass airflow;

a multiple of passages that comprise a tailored cross-sectional geometry, at least one of the multiple of fins contains at least one passage of the multiple of passages; and a tank within the core cowl door, the tank in fluid communication with at least one of the multiple of passages.

15. The core cowl door as recited in claim 14, wherein the external surface comprises the multiple of fins.

16. The core cowl door as recited in claim 14, further comprising a flexible conduit in communication with the tank and at least one of the multiple of passages.

17. The core cowl door as recited in claim 16, further comprising a distribution manifold that receives heated oil from a gas turbine engine and distributes the oil to the heat exchanger to extract heat therefrom, the distribution manifold in communication with the flexible conduit.

18. A core cowl assembly for a gas turbine engine comprising:

an articulatable first core cowl door;
an articulatable second core cowl door;
a first heat exchanger that comprises an external surface of the first core cowl door, the first heat exchanger comprises a first multiple of fins that extend outward from the first core cowl door into a fan bypass airflow, at least one of the first multiple of fins contains a passage that comprises a tailored cross-sectional geometry;
a second heat exchanger that comprises an external surface of the second core cowl door, the second heat exchanger comprises a second multiple of fins that extend outward from the second core cowl door into the fan bypass airflow, at least one of the second multiple of fins contains a passage that comprises a tailored cross-sectional geometry; and
a distribution manifold operable to receive heated oil from a gas turbine engine and distribute the oil to the first and second heat exchangers to extract heat therefrom.

19. The core cowl assembly as recited in claim 18, wherein the distribution manifold is in communication with the first and second heat exchangers via a respective flexible conduit.

20. The core cowl assembly as recited in claim 18, further comprising:
a first tank within the first core cowl door, the first tank in fluid communication with the passage of the first core cowl door; and
a second tank within the second core cowl door, the second tank in fluid communication with the passage of the second core cowl door.

21. The core cowl assembly as recited in claim 20, wherein the passage in the first core cowl door is a serpentine passage and the passage in the second core cowl door is a serpentine passage to enable a generally downward flow of oil along the first and second core cowl door toward the respective first and second tank.

* * * * *